Nov. 26, 1929.  C. H. DESAUTELS  1,737,111
APPARATUS FOR MARKING RUBBER AND RUBBERIZED MATERIAL
Filed March 23, 1928
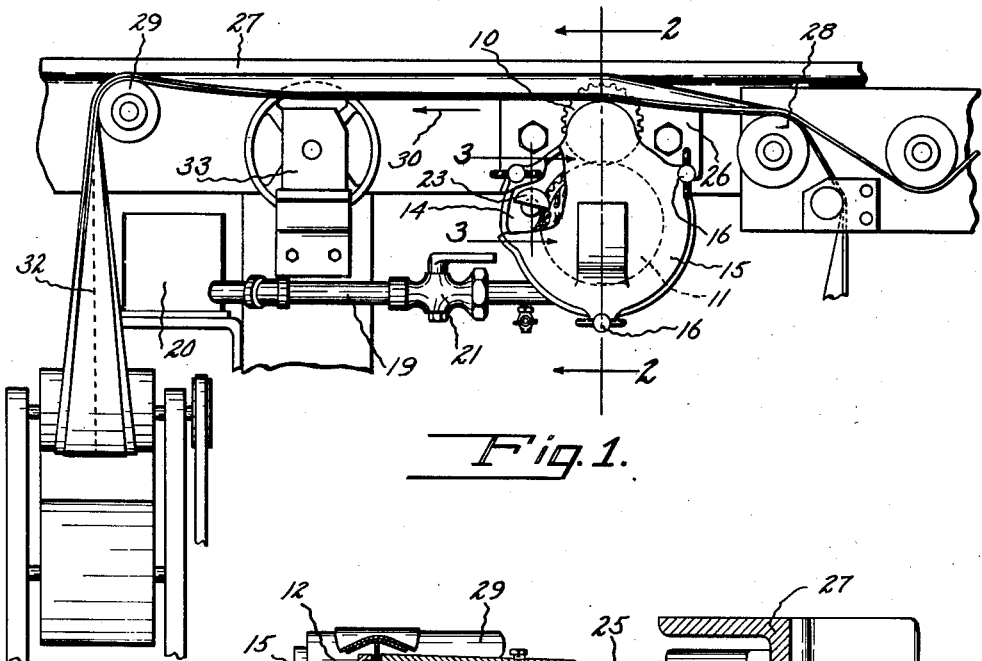
Fig. 1.
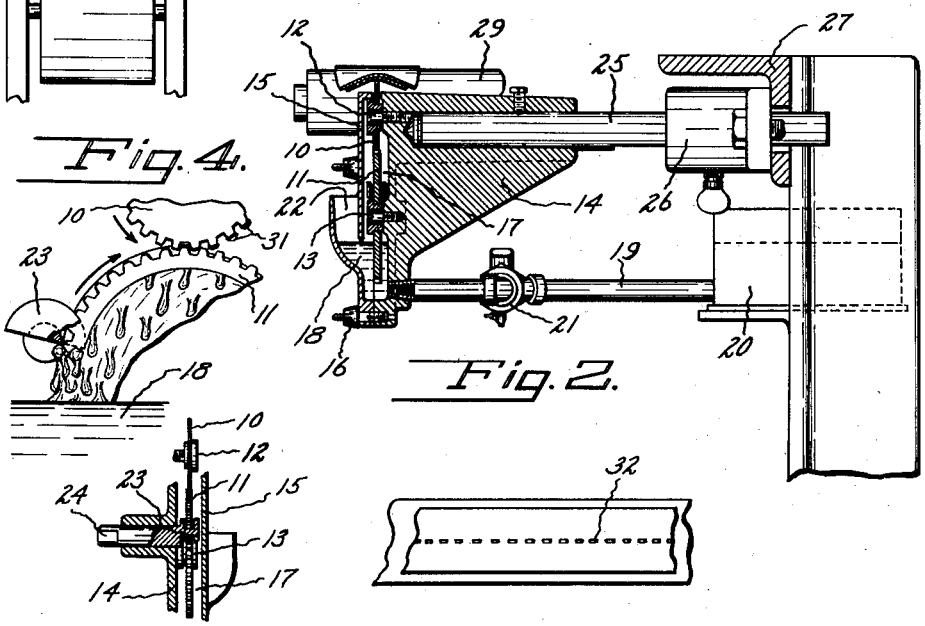
Fig. 4.
Fig. 2.
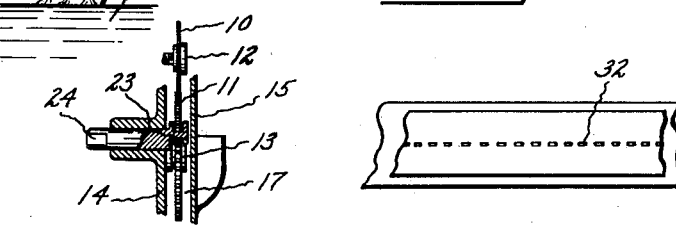
Fig. 3.
Fig. 5.
INVENTOR.
CHARLES H. DESAUTELS.
BY
ATTORNEY.

Patented Nov. 26, 1929

1,737,111

UNITED STATES PATENT OFFICE

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

APPARATUS FOR MARKING RUBBER AND RUBBERIZED MATERIAL

Application filed March 23, 1928. Serial No. 264,000.

This invention relates to the manufacture of strips of rubber or rubberized material such as is used in the manufacture of rubber tires, mats, etc., and more particularly it relates to a method and means for placing a marking on such strips as the latter are formed for ornamental or utilitarian purposes. The objects of my invention will be apparent from the following specification and claim.

As one embodiment of my invention, I have shown in the drawings a device for placing a guide line on a strip of plied material.

Referring to the drawings,

Fig. 1 is an elevation of the device, partly broken away, located on the frame of a fabric plying machine;

Fig. 2 is a view taken substantially on line 2—2 of Fig. 1;

Fig. 3 is view taken substantially on line 3—3 of Fig. 1;

Fig. 4 is an enlarged detail view of parts shown in Fig. 1; and

Fig. 5 shows a portion of fabric with a guide line marked upon it.

In marking or placing guide lines on strips of rubber or rubberized material, care must be taken to supply a line that can easily be seen as well as one that will not be easily removed or rubbed off. It is also desirable to supply a line that will not injure the rubber and which will blend in with the rubber when it is vulcanized. I have found that by using either a colored rubber cement or latex I will get a well defined line of a substance that may be easily vulcanized into the strips of rubber or rubberized material.

Difficulty, however, is encountered in attempting to use these materials in conventional marking devices due to the fact that the material is applied to the dies or marking rolls in relatively thin films. Latex or rubber cement under these conditions tends to set or partially air cure with the result that part adheres to the roll or die thus clogging the device and interfering with its operation. A further objection is imperfect marking and poor adhesion of the cement or latex to the rubber. According to my method I apply the material in globules or clots of sufficient body to resist air curing and my apparatus provides means whereby slight curing or coagulation of the marking material will not interfere with its action. Furthermore, in my device the marking material is almost entirely housed from the air.

The marking device consists of a pair of meshing gears 10 and 11 mounted on bearings 12 and 13 fitted on the recessed face of a housing 14. A cover 15 fitting over the face of the housing 14 is held in place against the housing by screws 16. The joining of the cover 15 and face of the housing 14 forms a chamber 17 for the gears 10 and 11. A tight joint is formed by the cover and housing with provision left at the top for the gear 10 to protrude. The lower portion of the chamber is adapted to hold a marking fluid 18 through which the gear 11 may turn. This fluid may be supplied to the chamber by a feed pipe 19 from a reservoir 20 or, upon the closing of a valve 21 on the feed pipe, through an opening 22 in the cover 15. An adjustable scraper 23, the end 24 of which projects through the housing 14, straddles the gear 11, cleaning it as it rotates of all but the desired amount of the fluid 18. The gear 11 is wider than the gear 10 so as to enable the teeth of gear 10 to be covered on the sides as well as on the face with the marking fluid carried by the gear 11.

The device, as used in the case illustrated in the drawings, is provided with a bar 25 adjustably fitted in a bearing 26 located on a frame 27 of a rubberized fabric plying machine.

Although the marking device may be used in various arrangements, I have shown it intermediate a pair of guiding rolls 28 and 29 on the frame 27. As the fabric travels over the rolls in the direction of arrow 30 it also travels over the marking device. The pressure of the fabric on the gear 10 will rotate it in the direction as shown in Fig. 4 and rotate the gear 11, in mesh with the gear 10, through the marking fluid 18, the said fluid adhering to the gear. All but the desired amount of the marking fluid is taken off by the scraper 23, the remaining fluid being carried around until a portion of it is transferred to the teeth of the gear 10 in the form of small clots or globules 31. The teeth of the gear 10 will then, during its rotation, deposit these clots on the fabric, forming, as shown especially in Fig. 5, a dotted line 32.

The device may be set by means of the adjustment between the bar 25 and the bearing 26 so that the marking will come at any desired place on the fabric. As shown in the drawings, the marking has been put in the center of the fabric. This marking may be varied by replacing the gears with other gears of different pitch causing, as the case may be, either wider or narrower spaces between the clots. Marking gears having their alternate teeth cut out may also be used to vary the dotted line.

A measuring device 33 may also be added to the frame 27 between the guiding rolls 28 and 29.

Having thus described my invention, I claim:

A device for marking a web of vulcanizable material which comprises a housing adapted to hold rubber cement in fluid form, a gear rotatable within the housing and positioned to turn through and carry a portion of the cement, an adjustable scraper straddling the toothed edge of the gear and adapted to remove the cement from the sides of the gear teeth, a second gear meshing with the cement carrying gear to receive the cement from the recesses between the teeth of the first gear in the form of globules adhering to the ends of the teeth of said second gear and means to guide a web of vulcanizable material over said second gear to thereby drive the gears and deposit the globules of cement, carried by the second gear, in spaced relation upon the web.

CHARLES H. DESAUTELS.